United States Patent [19]

Kazami et al.

[11] Patent Number: 5,506,648
[45] Date of Patent: Apr. 9, 1996

[54] FILM END DETECTING DEVICE OF CAMERA

[75] Inventors: Kazuyuki Kazami; Norikazu Yokonuma, both of Tokyo, Japan

[73] Assignee: Nikon Corporation, Tokyo, Japan

[21] Appl. No.: 478,673

[22] Filed: Jun. 7, 1995

Related U.S. Application Data

[63] Continuation of Ser. No. 281,529, Jul. 28, 1994, abandoned, which is a continuation of Ser. No. 185,151, Jan. 24, 1994, abandoned, which is a continuation of Ser. No. 790,167, Nov. 12, 1991, abandoned.

[30] Foreign Application Priority Data

Nov. 15, 1990 [JP] Japan ................. 2-309503
Mar. 13, 1991 [JP] Japan ................. 3-074031

[51] Int. Cl.⁶ .................. G03B 1/18; G03B 1/00; G03B 1/60
[52] U.S. Cl. .................. 354/173.11; 354/213; 354/218
[58] Field of Search .................. 354/171, 173.1, 354/173.11, 217, 218, 213

[56] References Cited

U.S. PATENT DOCUMENTS

| | | | |
|---|---|---|---|
| 4,400,074 | 8/1983 | Akiyama et al. | 354/173 |
| 4,417,793 | 11/1983 | Oyokota et al. | 354/21 |
| 4,572,637 | 2/1986 | Inoue | 354/173.11 |
| 4,664,491 | 5/1987 | Kazumi et al. | 354/105 |
| 4,857,946 | 8/1989 | Tominaga et al. | 354/173.1 |
| 4,860,039 | 8/1989 | Hata et al. | 354/106 |
| 4,864,332 | 9/1989 | Harvey | 354/21 |
| 4,885,599 | 12/1989 | Goto et al. | 354/173.11 |
| 4,967,217 | 10/1990 | Yamamoto et al. | 354/173.11 |
| 5,019,843 | 5/1991 | Ogawa et al. | 354/106 |
| 5,124,735 | 6/1992 | Tsukahara et al. | 354/106 |
| 5,130,728 | 7/1992 | Goto et al. | 354/105 |

FOREIGN PATENT DOCUMENTS

| | | |
|---|---|---|
| 2-173998 | 7/1990 | Japan . |
| 2088571 | 6/1982 | United Kingdom . |
| 2136143 | 9/1984 | United Kingdom . |

*Primary Examiner*—Michael L. Gellner
*Assistant Examiner*—Nicholas J. Tuccillo

[57] ABSTRACT

A film end detecting device of a camera, used for a film in which film aligning perforations are regularly formed in units of frames, includes: a winding device for winding the film, which has an end detection perforation formed at an interval smaller than the predetermined interval on a film end side of the film aligning perforation of the last frame; a detection device for detecting the perforations of the film; a time measuring device for, when the film is wound, measuring a time from when a given film aligning perforation is detected until the next perforation is detected; and a signal output device for, when the time measured by the time measuring device is shorter than a predetermined reference time, outputting a film end detection signal.

23 Claims, 14 Drawing Sheets

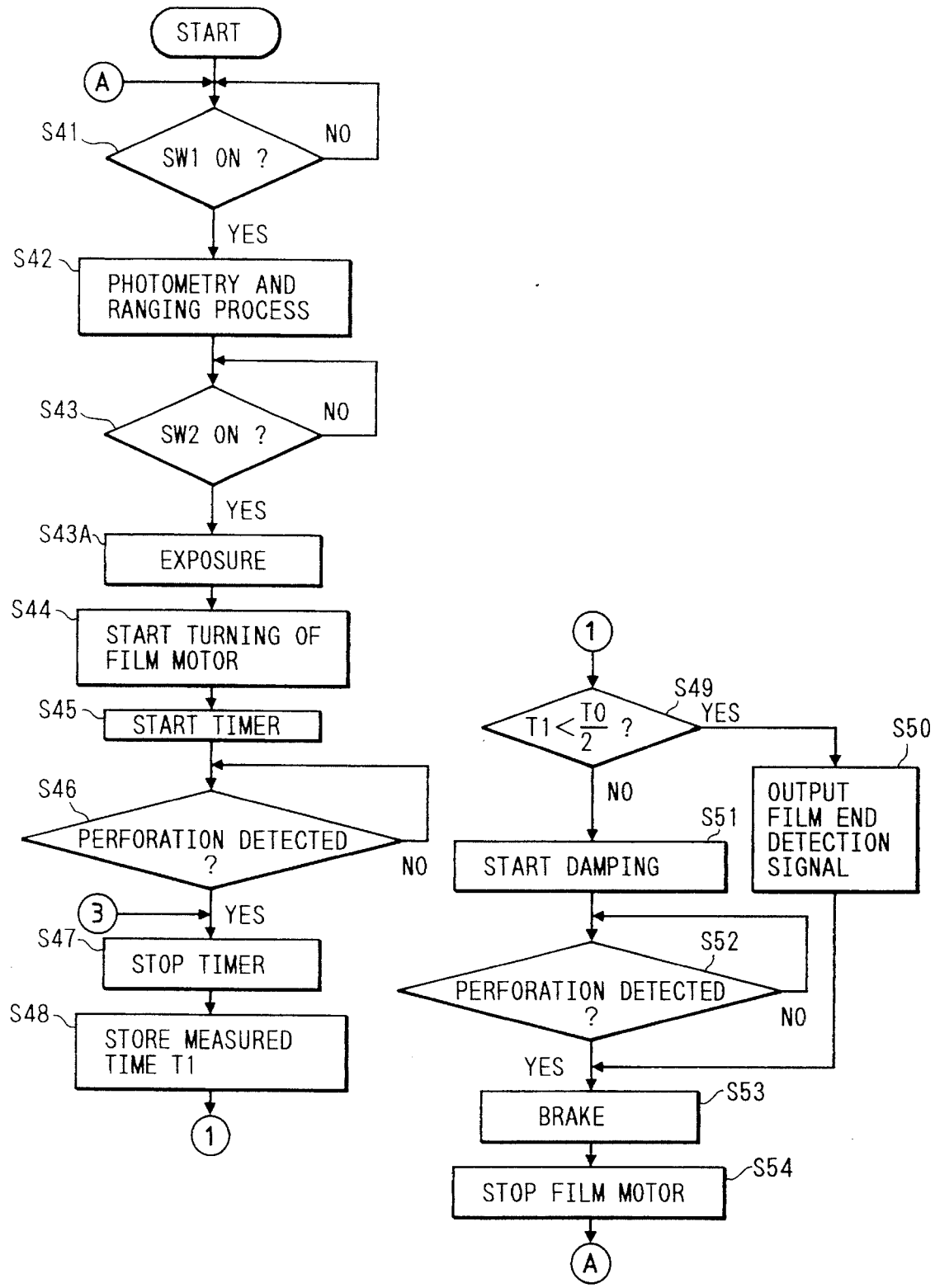

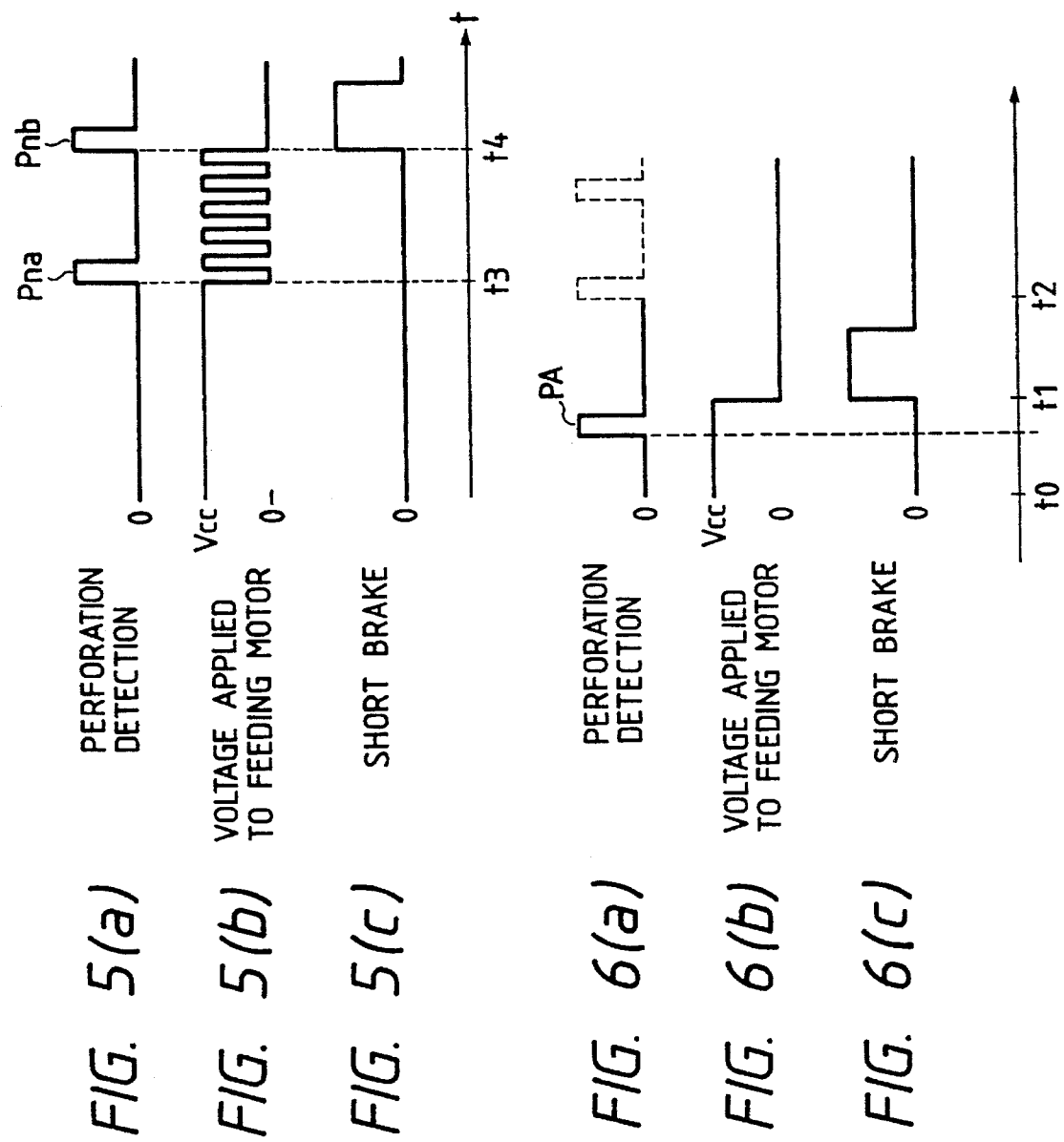

FIG. 9
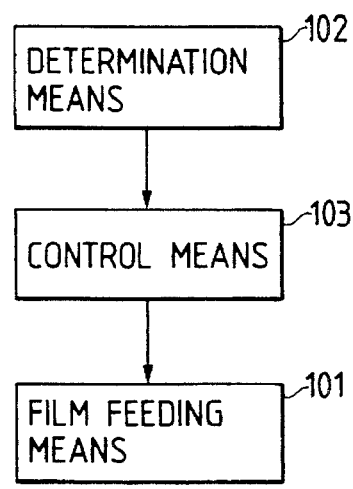
FIG. 10
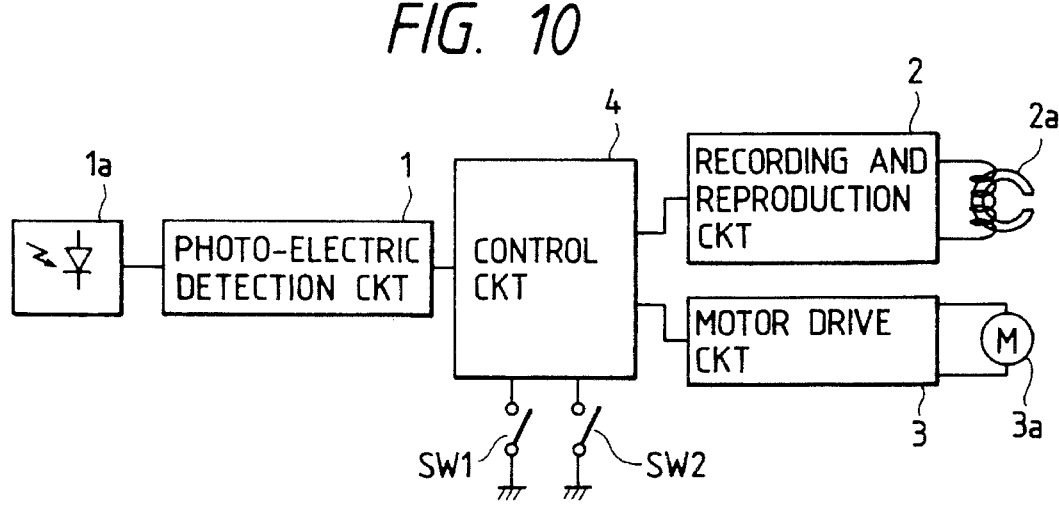
FIG. 11

FILM END DETECTING DEVICE OF CAMERA

This application is a continuation of application Ser. No. 08/281,529, filed Jul. 28, 1994, now abandoned, which application was a continuation of application Ser. No. 08/185,151, filed Jan. 24, 1994, now abandoned, which application was a continuation of 07/790,167, filed Nov. 12, 1991, now abandoned.

BACKGROUND OF THE INVENTION

1. Field of the Invention

The present invention relates to a film end detecting device of a camera.

2. Related Background Art

Conventionally, a pre-wind type camera, which draws out an entire unexposed film from a loaded film cartridge, and rewinds it into the film cartridge in every photographing operation, is known. Also, a technique for recording various pieces of information on a magnetic recording medium coated on a film is already known (U.S. Pat. No. 4,864,332).

When pieces of information to be recorded on the magnetic recording medium are ones in units of photographing frames, if these pieces of information are not recorded at predetermined positions in units of photographing frames, recorded information may not often be reproduced in correspondence with the photographing frames. In the conventional pre-wind type camera, the first frame (a frame closest to the film end) is aligned while drawing out a film, and the second or subsequent frame is aligned while rewinding a film. For this reason, only the first frame is undesirably shifted from other frames.

The present applicant proposed a film feed control device of a camera, which had an object to precisely align the first frame with a predetermined photographing position (Japanese Patent Application Laid-Open No. 2-173998). With this device, the number of photographable frames of a film are memorized or stored in advance in a camera, and perforations of the film are detected in a pre-wind operation to count the number of fed frames of the film. Then, whether or not all the photographable frames are drawn out is detected based on the count result and the stored number of frames. If it is detected that all the photographable frames are drawn out, the film is further drawn out by a predetermined amount. Thereafter, the film is. rewound to align the first frame with the predetermined position. In this manner, the first frame can be precisely aligned.

A pre-wind type camera or normal wind type camera for winding a film frame by frame in every photographing operation detects a state wherein a film is completely drawn out and can no longer be fed to determine a film end, and the camera stops a film feeding motor.

However, in the device described in Japanese Patent Application Laid-Open No. 2-173998, the number of fed frames of a film is counted in a pre-wind operation, and whether or not all the photographable frames are drawn out is detected based on the count result and the stored number of photographable frames. For this reason, for example, if a battery is removed during the pre-wind operation, the count result disappears. Therefore, even if a new battery is loaded to continue the pre-wind operation, the first frame cannot be aligned with the predetermined position.

As described above, in a camera, which determines a film end when a film is completely drawn out and can no longer be fed, the film is temporarily forcibly pulled although it can no longer be fed. As a result, the film may often be undesirably stretched or broken.

SUMMARY OF THE INVENTION

It is the first object of the present invention to provide a camera which can perform film end detection free from problems.

It is the second object of the present invention to provide a film end detecting device of a camera, which can perform film end detection before a film is completely drawn out to the film end.

It is the third object of the present invention to provide a film end detecting device, which can continue a pre-wind operation, and can precisely align the first frame even when a battery is removed during the pre-wind operation.

It is the fourth object of the present invention to provide a photographing information recording device of a camera, which can completely record information even for the last frame.

According to the first aspect of the invention, there is provided a film end detecting device of a camera, which is used for a film having film aligning perforations formed at a predetermined interval in correspondence with frames, comprising:

winding means for winding the film, which has an end detection perforation formed at an interval smaller than the predetermined interval on a film end side of the film aligning perforation of a last frame;

detection means for detecting the perforations of the film;

time measuring means for, when the film is wound, measuring a time from when a given film aligning perforation is detected until the next perforation is detected; and signal output means for, when the time measured by the time measuring means is shorter than a predetermined reference time, outputting a film end detection signal.

FIG. 1A illustrates the arrangement of this device.

In the device of this arrangement, in a film winding operation, the time measuring means measures a time from when a given film aligning perforation is detected until the next predetermined perforation is detected. When the time measured by the time measuring means is shorter than a predetermined reference time, the signal output means outputs a film end detection signal. In a pre-wind type camera, the first frame can be precisely aligned without counting the number of fed frames of a film in the film winding operation. Therefore, for example, when a battery is removed in a pre-wind operation, the first frame can be precisely aligned as long as a new battery is loaded to continue the pre-wind operation.

According to the above arrangement, since the film end can be detected before the film is completely drawn out to its end, the film can be stopped according to the film end detection signal. Therefore, the film can be prevented from being pulled in a feed disable state.

According to a modification, there is provided a film end detecting device of a camera, used for a film, in which first and second perforations are regularly formed in units of frames, and the first perforation for one frame is located to be closer to a leading end of the film than the second perforation, comprising:

winding means for winding the film, in which one end detection perforation is formed next to the second perforation for a last frame;

detection means for detecting the perforations of the film;

time measuring means for, when the film is wound, measuring a time from when the second perforation is detected until the next perforation is detected;

calculation means for calculating, based on the time measured by the time measuring means, an estimation time until the second next perforation will be detected; and signal output means for, when no perforation is detected from when the predetermined perforation is detected after an elapse of the calculated time, outputting a film end detection signal.

FIG. 1B illustrates the arrangement of this device.

In the device of this arrangement, in a film winding operation, the time measuring means measures a time from when the second perforation is detected until the next perforation is detected. The calculation means calculates, based on the time measured by the time measuring means, a time until the second next perforation is detected. When no perforation is detected from when the predetermined perforation is detected after an elapse of the calculated time, the signal output means outputs a film end detection signal. According to this device, the same effect as described above can be obtained. In addition, even when a film feeding speed changes for any cause during the film winding operation, a precise aligning operation can be assured.

According to another modification, there is provided a film end detecting device of a camera, used for a film, in which first and second perforations are regularly formed in correspondence with frames, and the first perforation for one frame is located to be closer to a leading end of the film than the second perforation, comprising:

winding means for winding the film, in which an interval L1 between the first and second perforations corresponding to a given frame is shorter than an interval L2 between the second perforation corresponding to the given frame and the first perforation corresponding to the next frame, and an end detection perforation is formed next to the second perforation corresponding to a last frame at an interval shorter than the interval L2;

detection means for detecting the perforations of the film;

time measuring means for, when the film is wound, detecting a time from when the second perforation is detected until the next perforation is detected; and signal output means for, when the time measured by the time measuring means is shorter than a predetermined reference time, outputting a film end detection signal.

In the device of this arrangement, in a film winding operation, the time measuring means measures a time from when the second perforation is detected until the next perforation is detected. When the measured time is shorter than the predetermined reference time, the film end detection signal is output. Thus, in a pre-wind type camera, the first frame can be aligned without counting the number of fed frames of a film in the film winding operation. Therefore, for example, when a battery is removed in a pre-wind operation, the first frame can be precisely aligned as long as a new battery is loaded to continue the pre-wind operation.

According to the above arrangement, since the film end can be detected before the film is completely drawn out to its end, the film can be stopped according to the film end detection signal. Therefore, the film can be prevented from being pulled in a feed disable state.

According to the second aspect of the invention, there is provided a photographing information recording device of a camera, which comprises film feeding means to wind a film by one frame upon completion of a photographing operation of each frame, and records information for a photographed frame in a recording region of the film upon the winding operation of the frame, comprising:

determination means for determining whether the photographed frame is a last frame; and control means for, when it is determined that the photographed frame is the last frame, controlling the film feeding means to wind the film by at least an amount capable of recording information for the last frame.

FIG. 9 illustrates the arrangement of this device.

In the device of this arrangement, when the determination means determines that the photographed frame is the last frame, the control means controls the film feeding means to wind the film by at least an amount capable of recording information for the last frame. Thus, even when the film end is detected during a period between the beginning of the winding operation of the last frame and a timing before completion of magnetic recording for the last frame, information can be completely recorded for the last frame.

BRIEF DESCRIPTION OF THE DRAWINGS

FIGS. 1A to 8 are views according to the first aspect of the present invention, in which FIGS. 1A and 1B are diagrams showing arrangements of a device of the present invention, and FIGS. 2 to 6 show an embodiment of the present invention, in which FIG. 2 is a block diagram showing the overall arrangement of a film end detecting device of a camera according to the present invention, FIG. 4 is a flow chart showing a processing sequence, FIGS. 5A to 6C are waveform charts showing a photosensor output waveform, a voltage waveform applied to a film feeding motor, and an operation waveform in a short brake mode of the film feeding motor, FIG. 7 is a flow chart showing a modification, and FIG. 8 is a flow chart showing another embodiment; and FIGS. 9 to 19 are views according to the second aspect of the present invention, in which FIG. 9 is a diagram showing an arrangement of a device according to the present invention, FIG. 10 is a block diagram showing the arrangement of a photographing information recording device of a camera according to an embodiment of the present invention, FIG. 11 is a view showing the positional relationship among a photosensor, a magnetic head, and an aperture, FIG. 14 is a flow chart showing another embodiment, FIG. 15 is a view showing the positional relationship between a photosensor and a film according to still another embodiment, FIG. 16 is a flow chart showing a control sequence, FIG. 17 is a flow chart showing a control sequence for determining the last frame, FIG. 18 is a view showing a modification wherein a photosensor is arranged at another position, and FIG. 19 is a flow chart showing a control sequence.

DESCRIPTION OF THE PREFERRED EMBODIMENTS

Embodiments according to the first aspect of the present invention will now be described.

An embodiment of the present invention will be described below with reference to FIGS. 2 to 6.

Figure 1A:
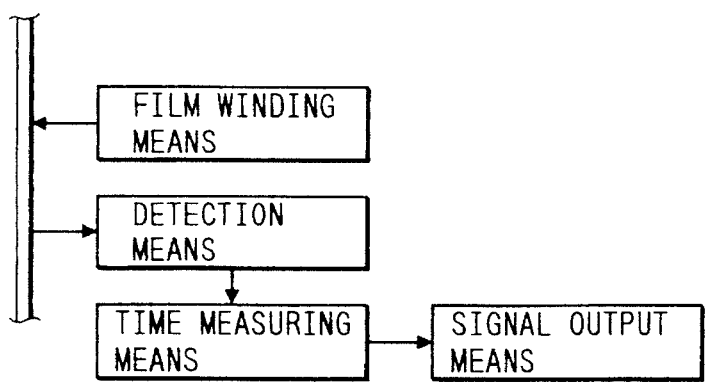
Figure 1B:
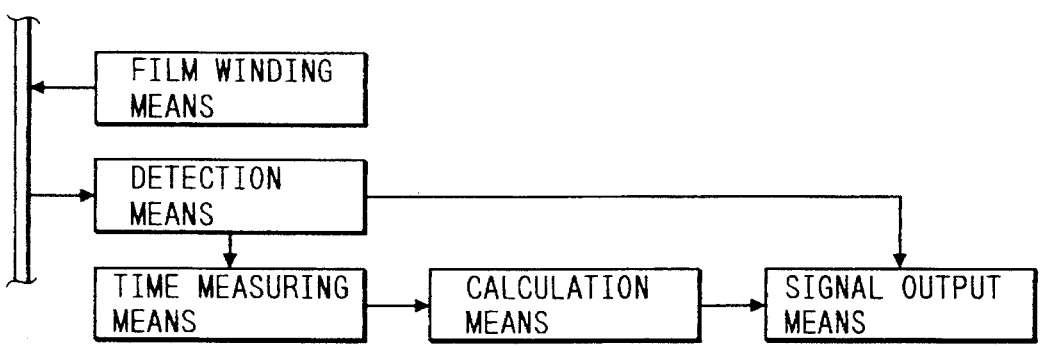
Figure 2:
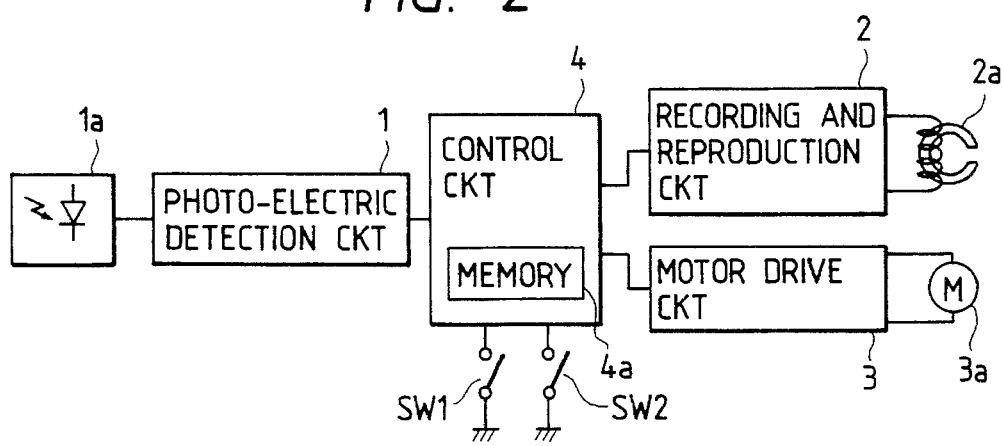

FIG. 2 is a block diagram showing a film end detecting device of a camera according to the present invention. A photo-electric detection circuit 1 detects perforations of a film using a connected photosensor 1a such as a photo-reflector. A recording and reproduction circuit 2 records various pieces of information on a film using a connected magnetic head 2a, and reproduces information such as the number of photographable frames, film sensitivity, and the like, recorded in advance on the film.

A motor drive circuit 3 drives a connected film feeding motor 3a to feed a film. The camera of this embodiment adopts a normal wind system for winding up a film frame by frame in every photographing operation. A half-depression switch SW1 is turned on in response to a half-depression operation of a release button (not shown). A full-depression switch SW2 is turned on in response to a full-depression operation (release operation) of the release button.

A control circuit 4 comprises, e.g., a microcomputer. The control circuit 4 controls the motor drive circuit 3 on the basis of signals from the switches SW1 and SW2, the photo-electric detection circuit 1, and the recording and reproduction circuit 2.

Figure 3A:
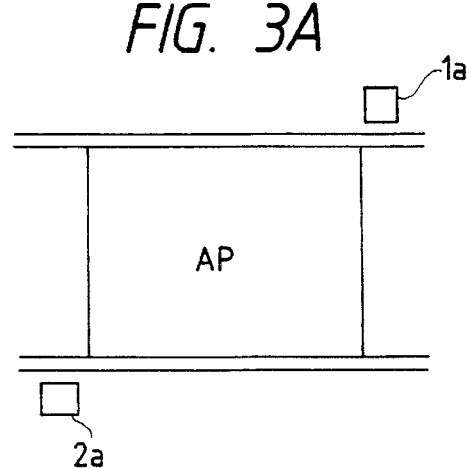
FIG. 3A is a view showing the positional relationship among an aperture of a camera, a photosensor, and a magnetic head.
Figure 3B:
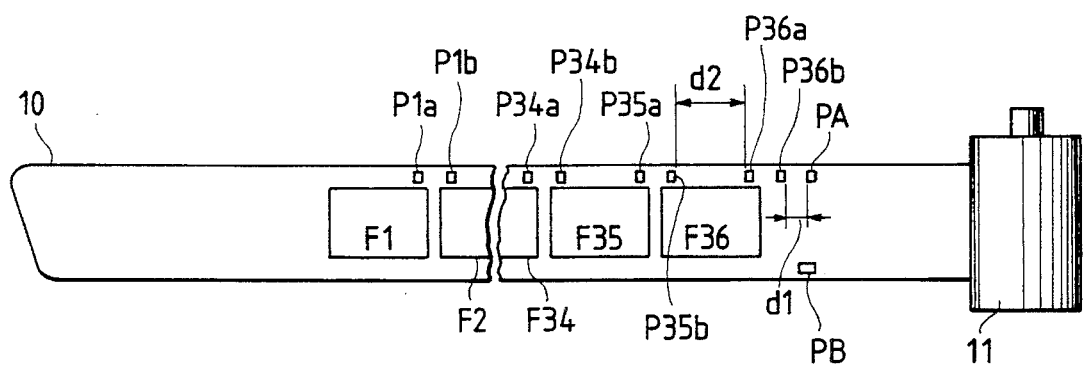
FIG. 3B is a view showing an example of a film used in the present invention.

FIG. 3A is a view showing the positional relationship among an aperture AP, the photosensor 1a, and the magnetic head 2a of the camera. FIG. 3B is a view showing an example, of a 36-frame film used in this embodiment, and shows a state wherein a film 10 is entirely drawn out from a cartridge 11. In this film 10, in order to assure a sufficient storage capacity outside photographing frames, the number of perforations used for a film feeding operation is decreased, minimum necessary perforations are formed in correspondence with photographing frames, and a blank space is assigned to a storage area. More specifically, a blank space except for all the perforations below the frames is used for a storage area.

In FIG. 3B, the film 10 has the first to 36th photographing frames F1 to F36, and pairs of perforations P1a and P1b, P2a and P2b, ..., Pna and Pnb, ..., P36a and P36b are formed at precise positions in correspondence with the photographing frames F1 to F36. A perforation Pna (first perforation) is located at a position closer to the leading end of the film than a perforation Pnb (second perforation). An end detection perforation PA is formed next to the perforation P36b.

When the first photographing frame F1 is aligned with the aperture AP shown in FIG. 3A, the photosensor 1a is located at a position opposing the perforation P1b. The same applies to all other frames. For example, when the 36th frame is aligned with the aperture AP, the photosensor 1a is located at a position opposing the perforation P36b. More specifically, the perforation Pnb corresponds to a film aligning perforation. An interval d1 between the perforations P36b and PA is set to be less than ½ an interval d2 between the perforations Pnb and P(n+1)a (n=1 to 36).

Note that a magnetic recording medium for recording various pieces of information is formed at a position of the film 10 opposing the magnetic head 2a on a side opposite to the perforations.

FIG. 4 is a flow chart showing a control sequence executed by the control circuit 4.

This program is started when a main switch (not shown) of the camera is turned on. In this case, assume that one of frames opposes the aperture AP, and the photosensor 1a can detect the second perforation Pnb of the frame.

In step S41, the control waits until the half-depression switch SW1 is turned on. If it is determined that the half-depression switch SW1 is turned on, a photometry circuit and a ranging circuit (neither are shown) are started to perform photometry and ranging operations in step S42. In step S43, the control waits until the full-depression switch SW2 is turned on. If it is determined that the full-depression switch SW2 is turned on, a photographing lens is driven according to the ranging result to perform a focusing operation, and a shutter and the aperture are controlled according to the photometry result to perform photographing (exposure) processing in step S43A.

In step S44, the motor 3a is turned through the motor drive circuit 3 to start a feeding operation of the film 10 by one frame. In step S45, an internal timer of the control circuit 4 is started to measure a predetermined time. In addition, information such as a photographing date is recorded on the magnetic recording medium by the magnetic head 2a through the recording and reproduction circuit 2 in a film winding operation. In step S46, the control waits for detection of a perforation. If it is determined that the perforation is detected, the time measurement by the timer is stopped in step S47. In step S48, the time measured by the timer, i.e., a time from the beginning of the frame feeding operation until a perforation is detected for the first time, is stored as T1.

At the time of step S43A, since the photosensor 1a is set in a state wherein it can detect the second perforation Pnb of the corresponding frame, the detected perforation is the first perforation of the next frame or the end detection perforation PA.

In step S49, it is checked if the time T1 is shorter than ½ a predetermined time T0, i.e., T0/2. The time T0 is a time from a state wherein the perforation Pnb is detected until the perforation P(n+1)a is detected. If YES in step S49, the flow advances to step S50; otherwise, the flow advances to step S51.

As described above, since the interval d1 between the perforations P36b and PA is less than ½ the interval d2 between the perforation Pnb and P(n+1)a (n=1 to 26), YES in step S49 means that the perforation detected in step S46 is the end detection perforation PA. In this case, therefore, a film end detection signal is output in step S50. The flow then advances to step S53 to brake the film feeding motor 3a. More specifically, the drive electrode of the motor 3a is short-circuited at time t1 shown in FIG. 6C to perform dynamic braking, and the film 10 is stopped in step S54. Note that time t0 indicates time at which the film winding operation is started, and time t2 indicates detection time of the perforation Pna if it is detected. A time interval t2–t0 corresponds to the time T0, and a time interval t1–t0 corresponds to T0/2.

NO in step S49 means that the perforation P(n+1)a is detected. In this case, the flow advances to step S51 to start a damping operation for stopping the film. Thereafter, the flow advances to step S52. In the damping operation, in order to precisely stop the frame of the film 10 at a position opposing the aperture AP, a voltage Vcc is intermittently applied to the film feeding motor 3a to drive the motor at a low speed, as shown in FIG. 5B. As shown in FIG. 5A, the damping drive operation is started from time t1 at which the perforation Pna is detected by the photosensor 1a, and is continued until time t4 at which the photosensor 1a detects the perforation Pnb.

In step S52, the control waits for detection of the perforation again. If it is determined that the perforation is detected, the flow advances to step S53. In step S53, the film feeding motor 3a is braked. More specifically, the drive electrode of the motor 3a is short-circuited at time t4 shown in FIG. 5C to perform dynamic braking, thereby precisely stopping the film at a position where the photosensor 1a detects the perforation Pnb, i.e., where the predetermined frame of the film 10 opposes the aperture AP.

According to the above-mentioned sequence, when the film is fed by one frame, a time from when the film aligning perforation Pnb is detected until the next perforation is detected is measured, and when the measured time is shorter than the predetermined reference time, the film end detection signal is output to stop the motor 3a. Therefore, the film end can be detected, and the motor 3a can be stopped before the film is completely drawn out to its end. Thus, the film can be prevented from being pulled in a feed disable state.

In the arrangement of the above embodiment, the motor drive circuit 3 and the motor 3a constitute a winding means 101, the photo-electric detection circuit 1 and the photosensor 1a constitute a detection means 102, and the control circuit 4 constitutes a time measuring means 103 and a signal output means 104.

In the above description, two perforations are formed in correspondence with each frame. However, the present invention can be applied to a case wherein only one perforation, i.e., an aligning perforation, is formed in each frame.

In the above description, the normal wind type camera is used. However, the present invention can be applied to a pre-wind type camera, which draws out a film to its end upon loading of a film. In this case, in a pre-wind operation, a time from when an aligning perforation of each frame is detected until an aligning perforation of the next frame is detected is sequentially measured, and when the measured time is smaller than a predetermined value, the film end can be determined. According to this arrangement, the first frame can be precisely aligned without counting the number of fed frames of a film in a film winding operation unlike in the conventional camera. Therefore, even when a battery is removed during a pre-wind operation, the first frame can be precisely aligned as long as a new battery is loaded to continue the pre-wind operation.

The one-frame feeding time T0 set in advance in the camera may be set in consideration of a power supply voltage, a temperature condition, and the like as values unique to the camera, or may be set on the basis of a film feeding time one frame before.

Furthermore, in this embodiment, a time measurement operation using the timer is started from the beginning of the film winding operation, thereby measuring a time until a perforation is detected. This timer may also be used as a timer for detecting a state wherein the film is stopped for any cause.

Figure 7:
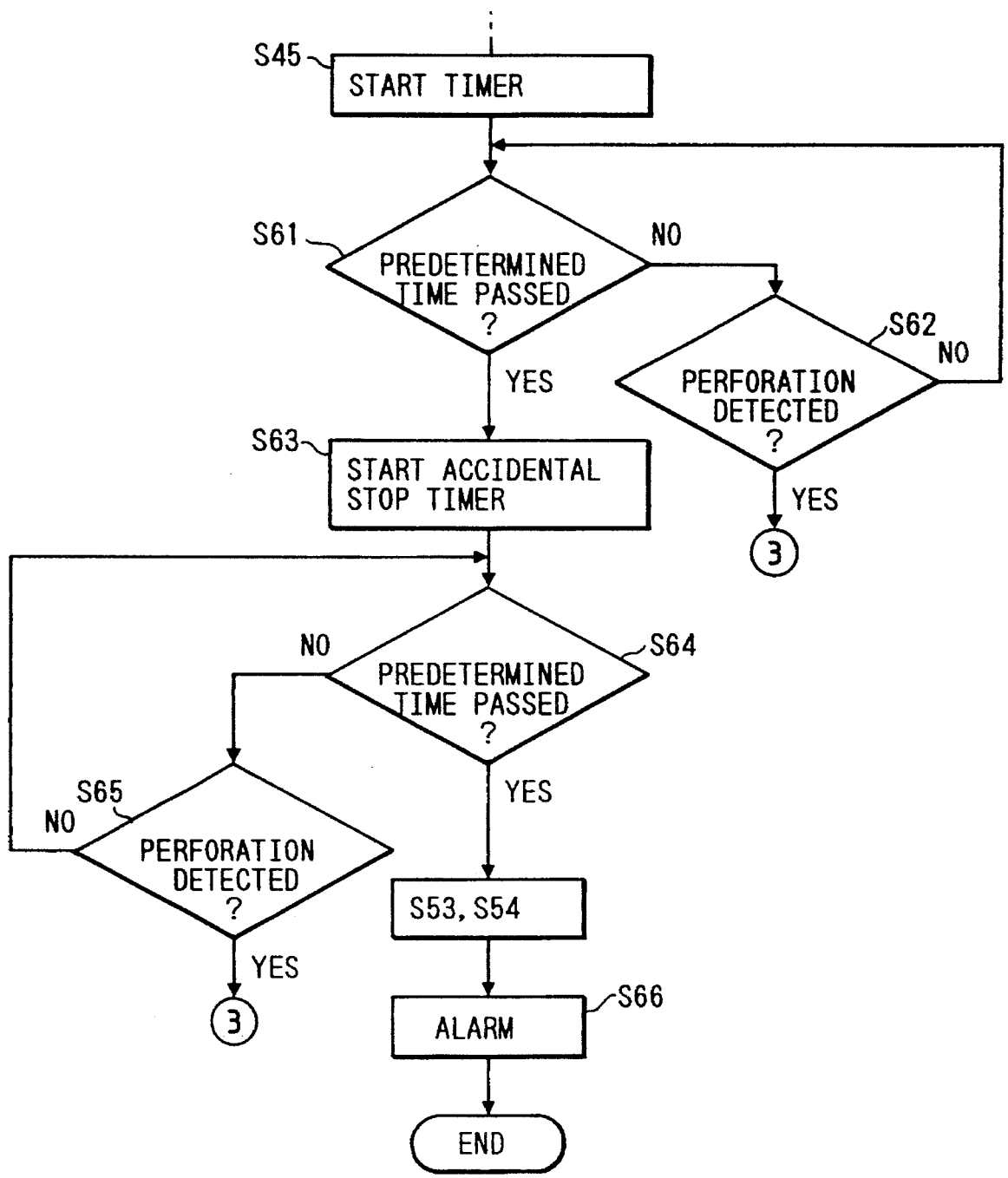

More specifically, in FIG. 7, after the timer is started in step S45 in FIG. 4, it is checked in step S61 if a predetermined time passes. If NO in step S61, it is checked in step S62 if a perforation is detected. If NO in step S62, the flow returns to step S61; otherwise, the flow advances to step S47 in FIG. 4.

If YES in step S61, i.e., if the perforation cannot be detected after an elapse of the predetermined time, the timer is started again as an accidental stop detection timer in step S63. In step S64, it is checked if the predetermined time passes. If perforation detection cannot be attained in step S65 after it is determined that the predetermined time has passed, it is determined that the film is accidentally stopped. The processing operations in steps S53 and S54 in FIG. 4 are performed, and an alarm is generated in step S66, thus ending processing.

Figure 8:
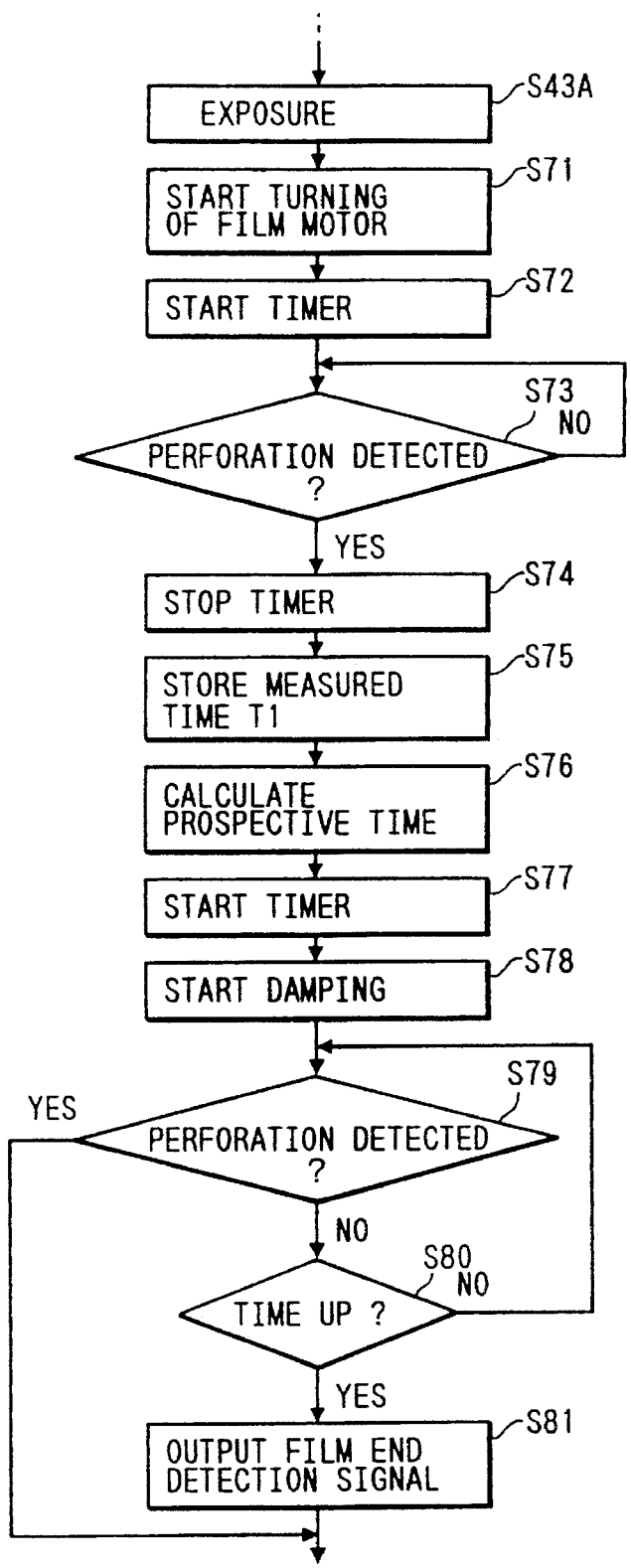

FIG. 8 is a flow chart showing another embodiment.

In the flow chart shown in FIG. 4, since a one-frame feeding time is fixed, the film may not often be stopped at a desired timing when the film feeding speed is changed during the winding operation. This embodiment is made to prevent this. Since steps S41 to S43A in FIG. 8 are the same as those in FIG. 4, processing in step S43A and subsequent steps will be described below.

In FIG. 8, when exposure processing is ended in step S43A, the motor 3a is turned in step S71 to start the winding operation of the film 10. In step S72, the timer is started to measure a time. In step S73, the control waits for detection of a perforation. If it is determined that the perforation is detected, the timer is stopped in step S74, and the flow advances to step 75. The perforation detected in this case is Pna or PA, like in the above-mentioned case.

In step S75, a time measured by the timer, i.e., a time from the beginning of the winding operation until the perforation is detected for the first time is. stored as T1. In step S76, a time (prospective time) until the next perforation is detected is calculated. More specifically, the perforation detected in step S73 is assumed to be Pna, and a time until the next perforation Pnb is detected is calculated on the basis of the time T1, and an interval between adjacent perforations stored in advance in the control circuit 4. This time is calculated in consideration of a damping operation started in step S78.

In step S77, the timer is started again. In step S78, the damping operation is started. In step S79, it is checked if the perforation is detected. If YES in step S79, the flow advances to step S53 in FIG. 4; otherwise, it is checked in step S80 if a time passing from the start of the timer in step S77 reaches the time calculated in step S76. If NO in step S80, the flow returns to step S79; otherwise, the film end detection signal is output in step S81, and the flow advances to step S53 in FIG. 4.

According to the above-mentioned sequence, in a film winding operation, a time from when the second perforation Pnb is detected until the next perforation (first perforation P(n+1)a or PA) is detected in step S73 is measured, and a time until the next perforation is detected is calculated on the basis of the measured time. If the perforation cannot be detected after an elapse of the calculated time from detection of the perforation P(n+1)a or PA, the film end is determined. More specifically, if a frame photographed in step S43A is the last frame F36, the perforation detected in step S73 is PA, and a time until the next perforation is detected is calculated on the basis of a time until the perforation PA is detected. However, since no perforation is present next to PA, the perforation cannot be detected after an elapse of the calculated time, and the film end is determined.

In this manner, a time until the next perforation is detected is measured in a feeding operation of each frame, a detection time of the next perforation is calculated on the basis of the measured time, and the film end is detected based on the calculated time. Therefore, even when a feeding speed is decreased for any cause in a feeding operation of a film near the film end, end detection can be precisely performed.

Embodiments of a photographing information recording device according to the second aspect of the present invention will now be described.

FIG. 10 is a block diagram showing an arrangement of a photographing information recording device of a camera according to the present invention. A photo-electric detection circuit 1 detects perforations of a film 10 (FIGS. 12A and 12B) using a connected photosensor 1a such as a photo-reflector. A recording and reproduction circuit 2 records information such a photographing date on a film using a connected magnetic head 2a.

A motor drive circuit 3 drives a connected film feeding motor 3a to perform a film feeding operation (winding or rewinding operation). The camera of this embodiment adopts a normal wind system for winding up a film frame by frame in every photographing operation. A half-depression switch SW1 is turned on in response to a half-depression operation of a release button (not shown). A full-depression switch SW2 is turned on in response to a full-depression operation (release operation) of the release button. A control circuit 4 comprises, e.g., a microcomputer. The control circuit 4 controls the motor drive circuit 3 and the recording and reproduction circuit 2 on the basis of signals from the switches SW1 and SW2, and the photo-electric detection circuit 1, as will be described later.

Figures 12A, 12B:
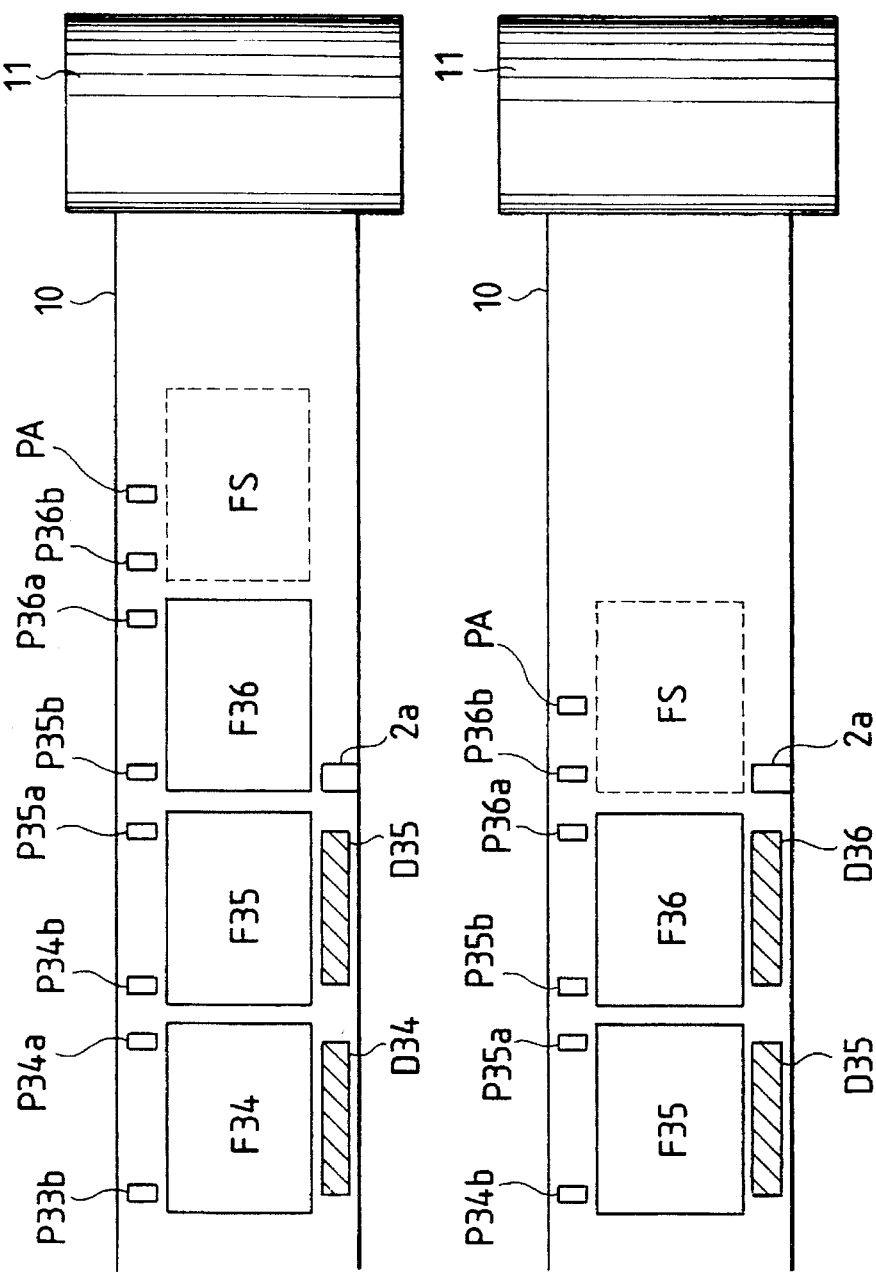
FIGS. 12A and 12B are views showing the positional relationship among photographing frames, perforations, and magnetic recording regions on a film.

FIG. 11 is a view showing the positional relationship among an aperture AP, the photosensor 1a, and the magnetic head 2a of the camera. FIGS. 12A and 12B are views showing a portion of a 36-frame film used in this embodiment. In this film 10, in order to assure a sufficient storage capacity outside photographing frames, the number of perforations used 10 for a film feeding operation is decreased, minimum necessary perforations are formed in correspondence with photographing frames, and a blank space is assigned to a storage area. More specifically, a blank space except for all the perforations below the frames is used for a storage area.

In FIG. 12A, the 34th, 35th, and 36th photographing frames are indicated by F34, F35, and F36. In this film 10, magnetic recording regions Dn are formed in correspondence with the photographing frames Fn (n=1 to 36), and two perforations Pna and Pnb are formed at precise positions for each photographing frame Fn. The perforation Pna (first perforation) is located at the trailing end side of the film with respect to the frame Fn, and the perforation Pnb (second perforation) is located at the leading end side of the next frame. An end detection perforation PA is formed next to the perforation P36b.

When a kth photographing frame Fk is aligned with the aperture AP shown in FIG. 11, the photosensor 1a is located at a position where it detects the second perforation Pkb, and the magnetic head 2a opposes the leading end portion of the magnetic recording region Dk. An interval between the perforations P36b and PA is shorter than an interval between the perforations P(n−1)b and Pna (n=1 to 36).

Figure 13A:
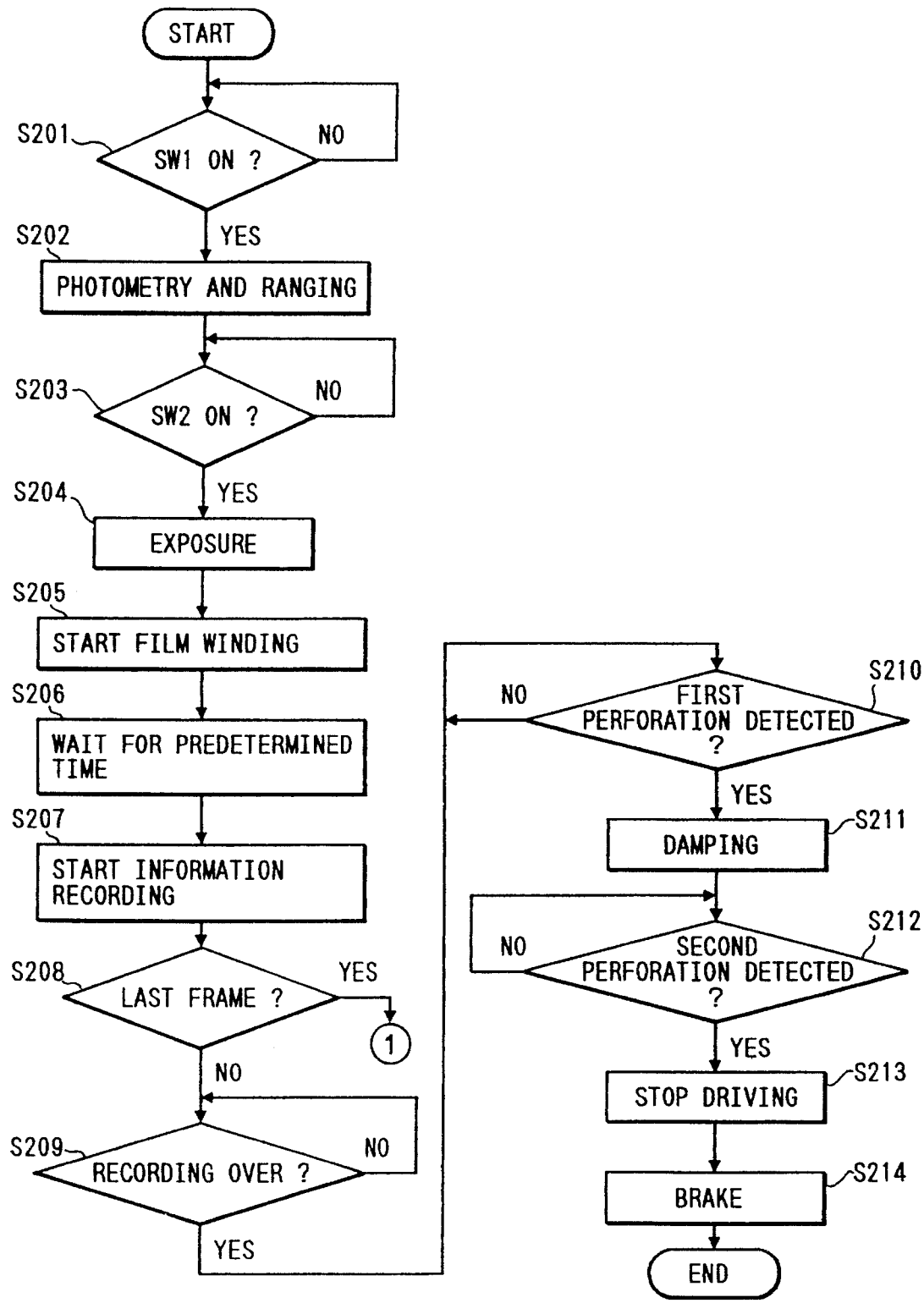
FIG. 13A and 13B are flow charts showing a control sequence.
Figure 13B:
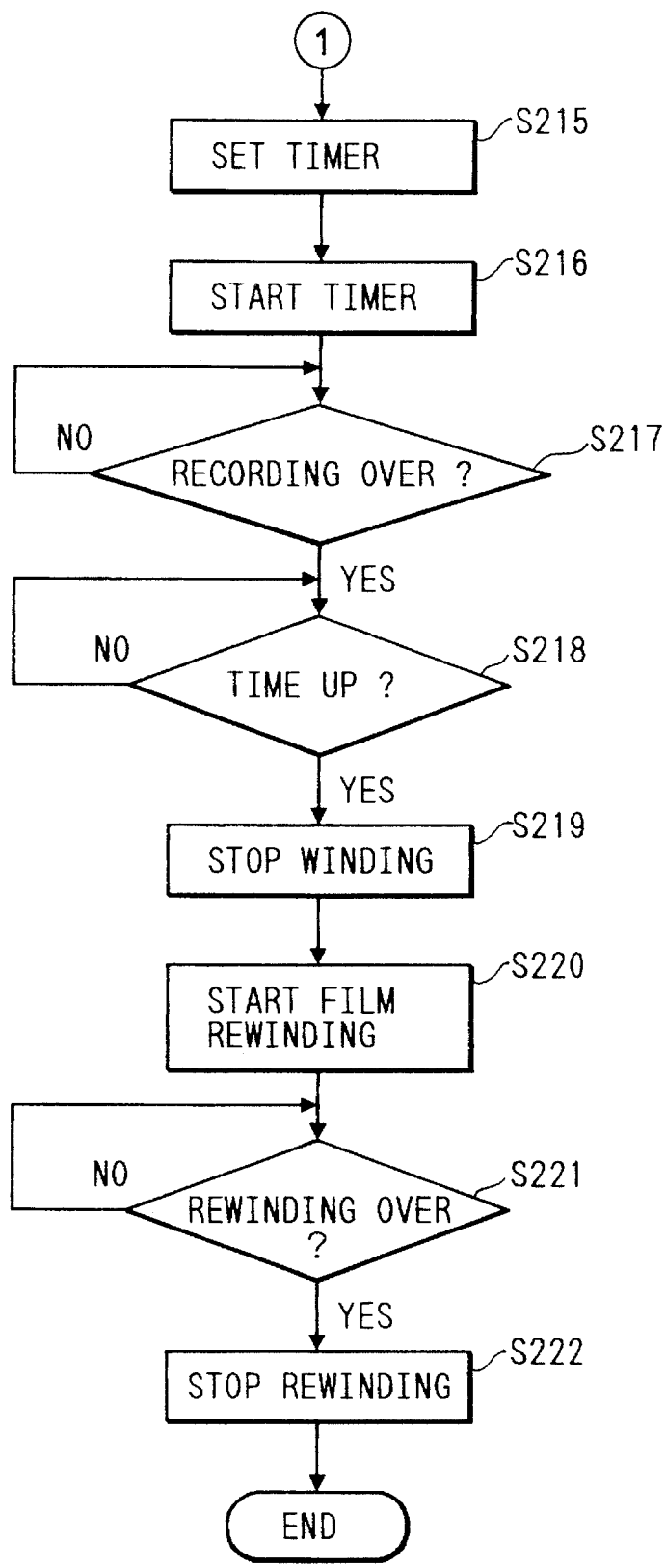

FIG. 13A and 13B are flow charts showing a control sequence executed by the control circuit 4.

This program is started when a main switch (not shown) of the camera is turned on. In this case, assume that one of the frames opposes the aperture AP, and the photosensor 1a can detect the second perforation Pnb of the frame.

In step S201 in FIG. 13A, the control waits until the half-depression switch SW1 is turned on. If it is determined that the half-depression switch SW1 is turned on, a photometry circuit and a ranging circuit (neither are shown) are started to perform photometry and ranging operations in step S202. In step S203, the control waits until the full-depression switch SW2 is turned on. If it is determined that the full-depression switch SW2 is turned on, a photographing lens is driven according to the ranging result to perform a focusing operation, and a shutter and the aperture are controlled according to the photometry result to perform photographing (exposure) processing in step S204.

In step S205, the motor 3a is turned through the motor drive circuit 3, thus starting a winding operation (one-frame feeding operation) of the film 10. After the control waits for a predetermined time in step S206, information such as a photographing date is recorded on the magnetic recording region Dn for the corresponding photographing frame by the magnetic head 2a through the recording and reproduction circuit 2 in step S207. The reason why the control waits for the predetermined time is to start recording after the rotation of the motor is stabilized since a film feeding amount cannot be stabilized at the beginning of rotation of the motor.

In step S208, it is checked if the photographing frame (a frame photographed in step S204) is the last frame (36th frame). In this checking step, the number of frames is counted in every photographing operation, and if it is determined that the count result has reached a predetermined value, the last frame can be determined. If NO in step S208, the flow advances to step S209, and the control waits for the end of the information recording operation. If the recording operation is ended, the control waits in step S210 until the first perforation P(n+1)a of the next frame is detected. More specifically, if the corresponding photographing frame is F35, the control waits for detection of the perforation P36a. When the perforation P(n+1)a is detected, the flow advances to step S211 to start a damping operation for stopping the film, and the flow then advances to step S212. In the damping operation, in order to precisely stop the frame of the film 10 at a position opposing the aperture AP, a voltage is intermittently applied to the film feeding motor 3a to drive the motor at a low speed.

In step S212, the control waits for detection of the second perforation P(n+1)b of the next frame. If it is determined that the second perforation P(n+1)b is detected, the drive operation of the motor 3a is stopped in step S213, and the motor is braked and stopped in step S214. Thereafter, the processing is ended.

On the other hand, if it is determined in step S208 that the photographing frame is the last frame, the flow advances to step S215 in FIG. 13B to set a measurement time of the timer. In step S216, the timer is started. The setting time is a film feeding time required for recording information for the last frame, and is determined in advance by the camera. In step S217, the control waits for the end of magnetic recording. When the magnetic recording is ended, the control waits until the time measured from the start of the timer reaches the setting time (until time-up). When the setting time is reached, the film winding operation is stopped in step S219. In step S220, the motor 3a is reversed to start a rewinding operation of the film. In step S221, the control waits for completion of the rewinding operation. When the rewinding operation is completed, the motor 3a is stopped in step S222, thus ending the processing.

According to the above-mentioned sequence, the film is wound by one frame upon completion of a photographing operation of each frame, and information for the photographing frame is recorded on the magnetic recording region of the film 10 in the winding operation. If it is determined that the photographing frame is the last frame (36th frame), time measurement is started, and thereafter, a film winding operation is performed until information recording is ended and a predetermined time passes. As a result, a state shown in FIG. 12B is established. Thereafter, the rewinding operation of the film 10 is started. According to this embodiment, since the winding operation for one frame (indicated by FS in FIGS. 12A and 12B) is performed after the photographing operation of the last frame, information can be reliably recorded for the last frame.

In the arrangement of the above embodiment, the motor drive circuit 3 and the motor 3a constitute a winding means 101, the photo-electric detection circuit 1, the photosensor 1a, and the control circuit 4 constitute a determination means 103, and the control circuit 4 constitutes a control means 104.

In place of using the timer, the film winding operation may be stopped when the end of information recording is determined in step S217. When information recording is ended upon detection of the first perforation P(n+1)a of the next frame, only the time-up determination may be executed. In the above embodiment, the predetermined time to be set in step S215 is determined beforehand. However, as shown in, e.g., FIG. 14, an actually measured film feeding time may be used.

Figure 14:
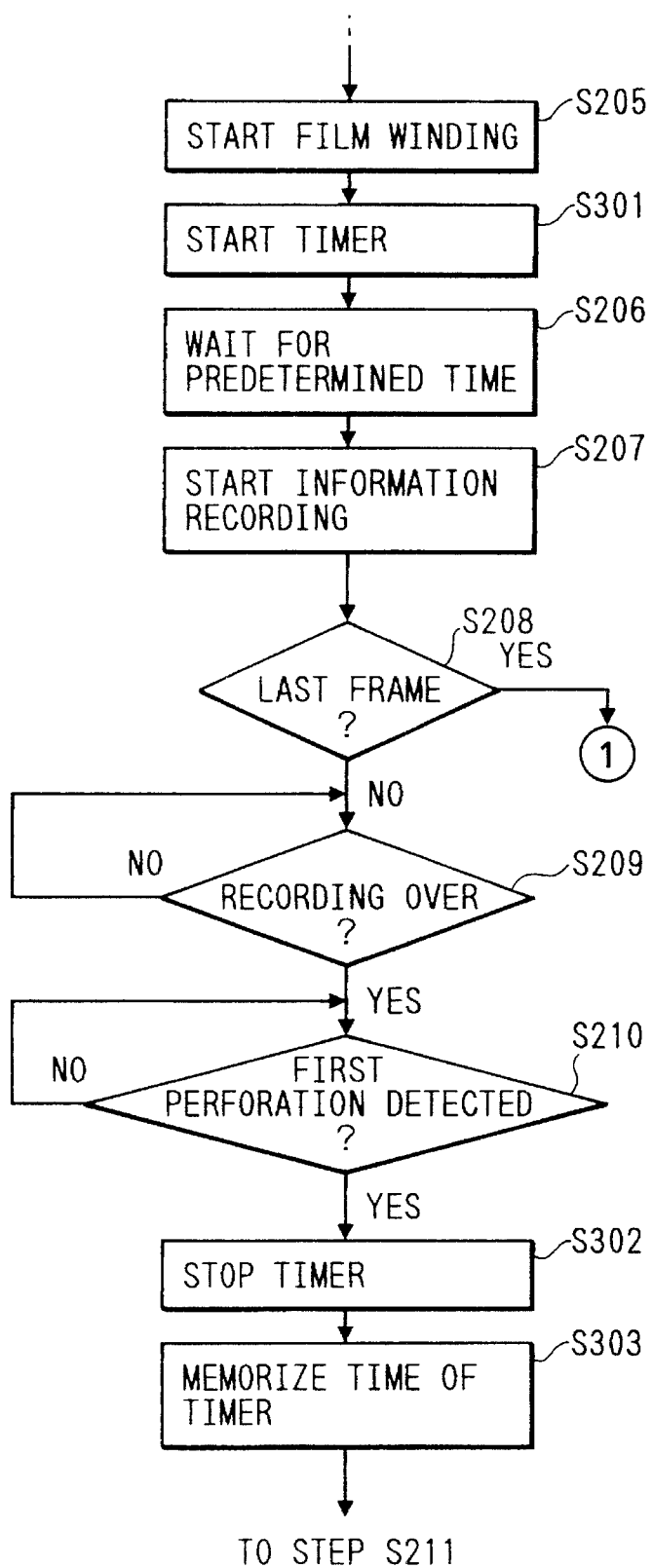

In FIG. 14, processing operations until step S205 are the same as those in FIG. 13A, and a detailed description thereof will be omitted. After the film winding operation is started in step S205, a timer for measuring a film feeding time is started in step S301. Thereafter, the processing operations in steps S206 to S210 described with reference to FIG. 13A are executed. If YES in step S210, the timer is stopped in step S302. In step S303, the time measured by the timer, i.e., a time required for winding the film by one frame, is stored, and the flow then advances to processing in step S211 and subsequent steps. The stored time is used in step S215. Thus, the winding operation for one frame can be performed after the photographing operation of the last frame like in the above embodiment.

Figure 15:
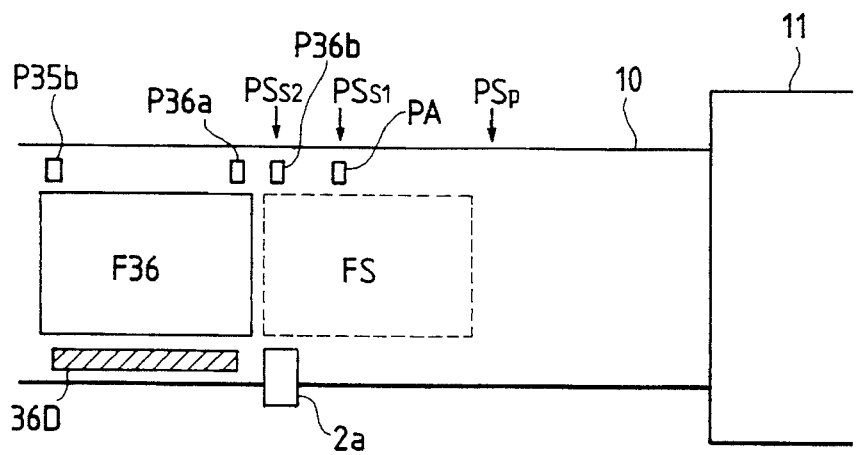
Figure 16:
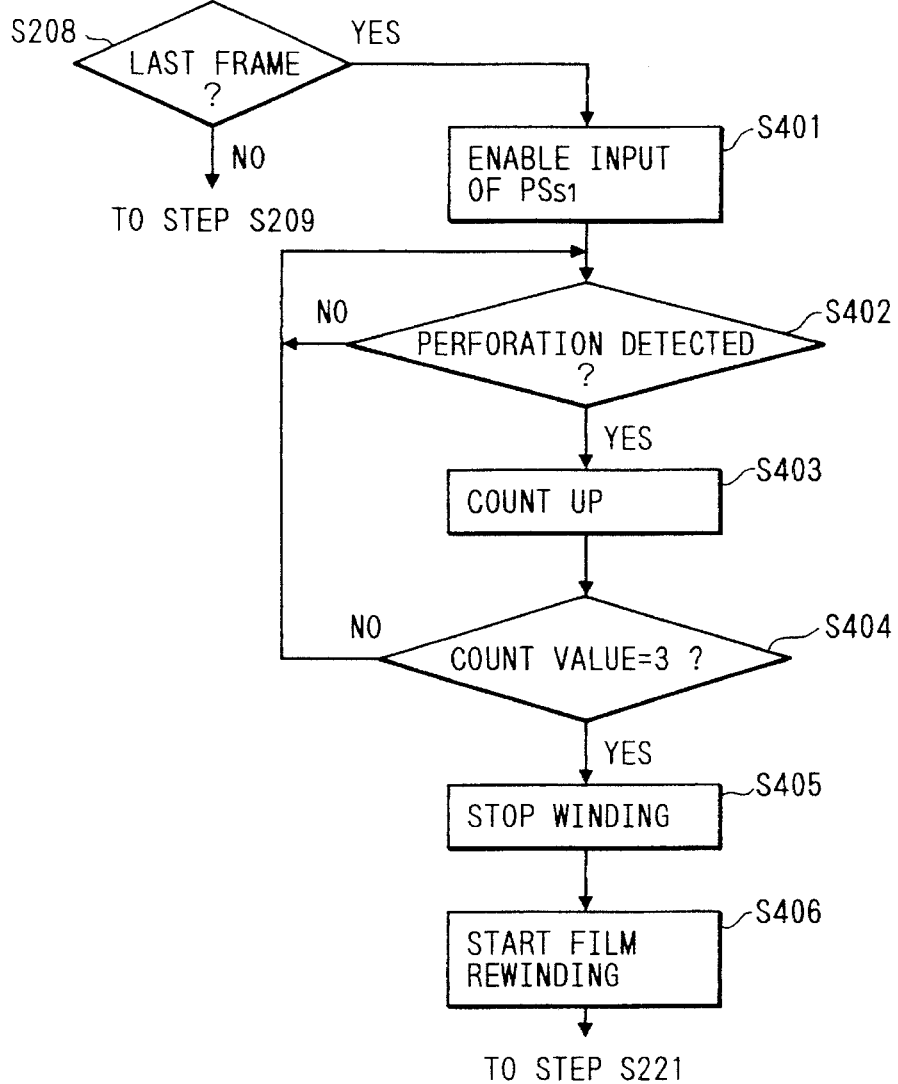

FIGS. 15 and 16 show still another embodiment using two photosensors. FIG. 15 shows a state wherein a recording operation for the last frame is ended, and a frame FS opposes the aperture AP. In FIG. 15, the photosensor 1a shown in FIG. 10 is arranged at a position PSp, and the other photosensor is arranged at a position PSs1.

FIG. 16 shows a control sequence, and processing operations until step S208 are the same as those in FIG. 13.

If the last frame is determined in step S208, the flow advances to step S401 to enable an input from the photosensor at the position PSs1. In step S402, the control waits until the photosensor detects a perforation. If the photosensor detects the perforation, a count-up operation is performed in step S403, and the flow advances to step S404. In step S404, it is checked if the count value is 3. If NO in step S404, the flow returns to step S402; otherwise, the flow advances to step S405. In step S405, the film winding operation is stopped, and in step S406, the film rewinding operation is started. The subsequent processing is the same as that in step S221 and subsequent steps in FIG. 13.

When the film winding operation is started from a position where the last 36th frame opposes the aperture AP, a perforation detected in the third detection by the photosensor at the position PSs1 is PA. In this case, the relationship between the film 10 and the magnetic head 2a is set in a state wherein the recording operation of the 36th frame is completed, as shown in FIG. 15. Therefore, when the winding operation is stopped when YES is determined in step S404, information recording can be reliably performed for the last frame like in the above embodiment.

The other photosensor may be arranged at a position indicated by PSs2. In this case, a perforation detected in the second detection is PA.

Figure 17:
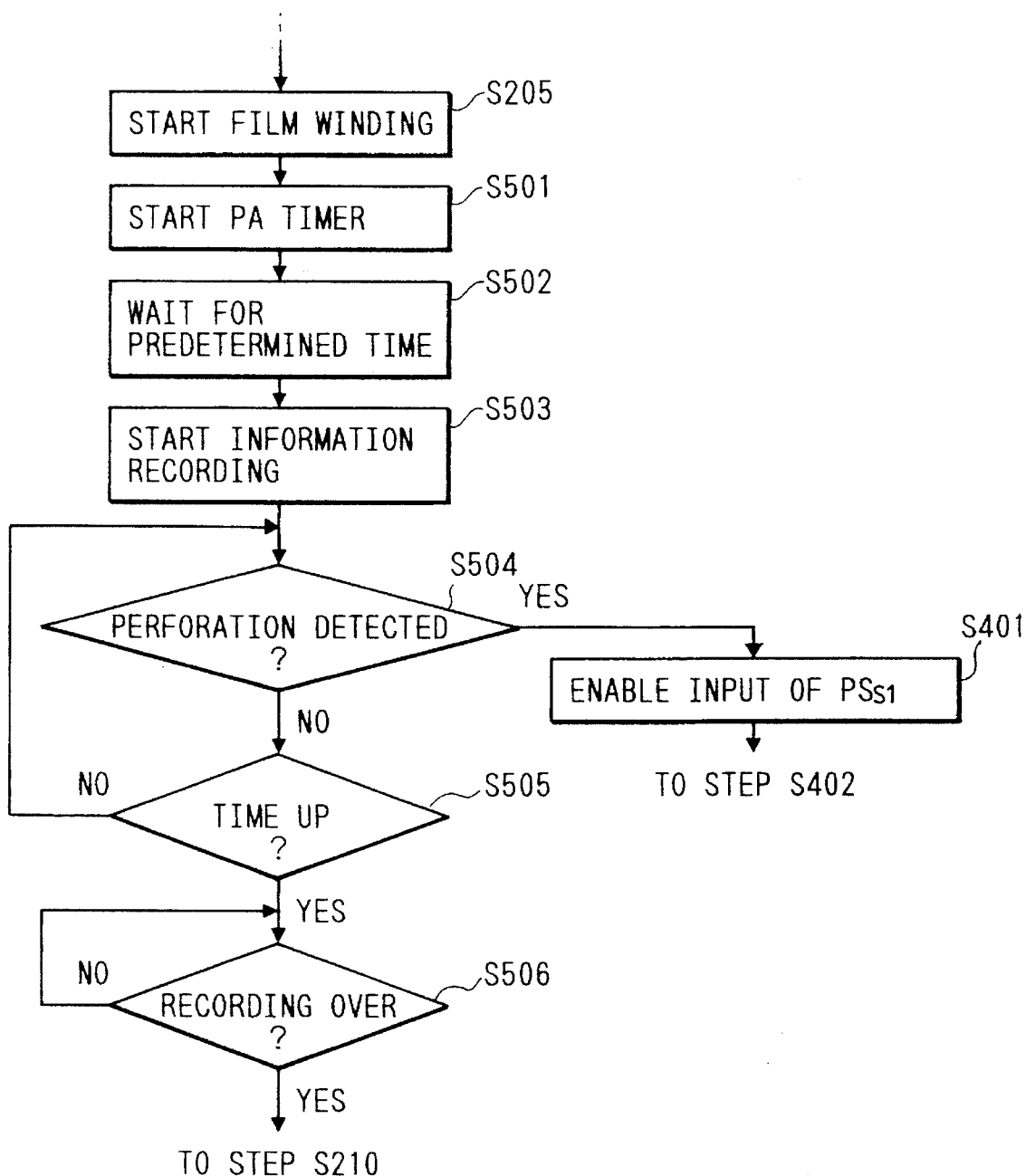

FIG. 17 shows an embodiment wherein the last frame is determined upon detection of the perforation PA.

In FIG. 17, processing operations until step S205 are the same as those in FIG. 13A. After the winding operation is started in step S205, a PA detection timer is started in step S501. Thereafter, the control waits for a predetermined wait time in step S502, and information recording is then started in step S503. In step S504, it is checked if a perforation is detected. If YES in step S504, it is determined that the perforation PA is detected, i.e., the photographing frame is the last frame, and the flow advances to processing in step S401 and subsequent steps. If NO in step S504, it is checked if a predetermined time passes from the start of the timer (time-up).

The predetermined time in this case is a time from a state wherein the perforation P36a is detected until the perforation PA is detected. More specifically, as described above, since the interval between the perforations P36b and PA is shorter than the interval between the perforations P(n−1)b and Pna (n=1 to 36), if the perforation is detected before time-up, this means that the detected perforation is PA.

If NO in step S505, the flow returns to step S504; otherwise, the flow advances to step S506. In step S506, the control waits for the end of recording. If the recording is ended, processing in step S210 and subsequent steps are executed.

Figure 18:
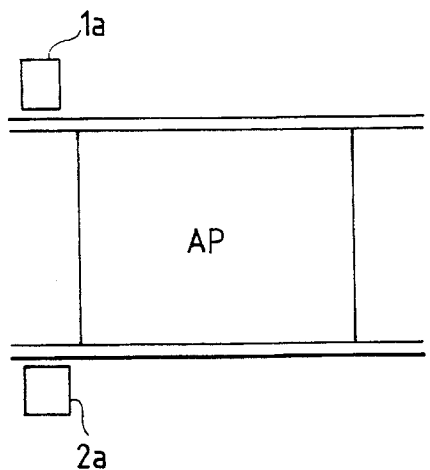
Figure 19:
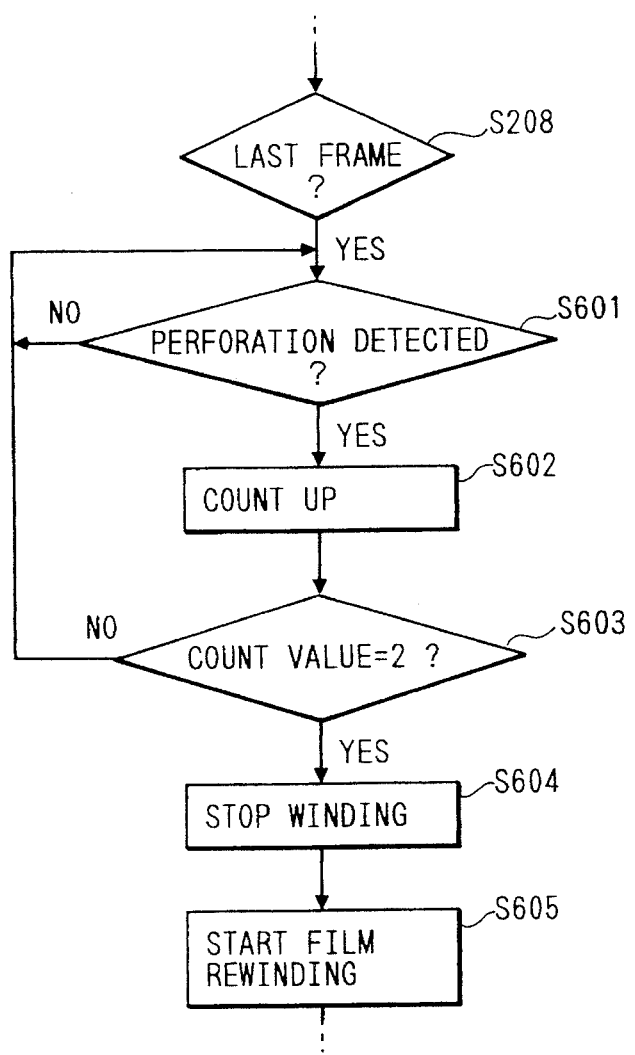

The position of the photosensor 1a is not limited to that in the above embodiment. For example, as shown in FIG. 18, the photosensor 1a may be arranged immediately above the magnetic head 2a. In this case, as shown in FIG. 19, after YES is determined in step S208, the control waits for detection of a perforation in step S601. If the perforation is detected, a count-up operation is performed in step S602. If it is determined in step S603 that the count value has reached 2, i.e., if the perforation P36b is detected, the winding operation is stepped in step S604, and the rewinding operation is started in step S605. Thus, information recording for the last frame can be reliably performed like in the above embodiment.

In the above description, a winding operation for one frame or more is performed to allow information recording after a photographing operation of the last frame. However, when a time required for information recording is shorter than a time required for winding one frame, the film may be wound by an amount less than one frame. That is, the film need only be wound by at least an amount capable of recording information for the last frame. The 36-frame film has been exemplified. However, the present invention may be applied to films having various other numbers of frames. Furthermore, in the above description, the magnetic recording region for each frame is formed immediately below the frame. However, the magnetic recording region may be formed above each photographing frame. Moreover, the present invention is not limited to magnetic recording. For example, information may be optically recorded.

What is claimed is:

1. A film end detecting device of a camera, which is used for a film having film aligning perforations formed at a predetermined interval in correspondence with frames, comprising:

winding means for winding the film, which has an end detection perforation formed at an interval smaller than the predetermined interval on a film end side of the film aligning perforation of a last frame;

detection means for detecting the perforations of the film;

time measuring means for, when the film is wound, measuring a time from when a given film aligning perforation is detected until the next perforation is detected; and signal output means for, when the time measured by said time measuring means is shorter than a predetermined reference time, outputting a film end detection signal.

2. A film end detecting device of a camera, used for a film, in which first and second perforations are regularly formed in units of frames, and the first perforation for one frame is located to be closer to a leading end of the film than the second perforation, comprising:

winding means for winding the film, in which one end detection perforation is formed next to the second perforation for a last frame;

detection means for detecting the perforations of the film;

time measuring means for, when the film is wound, measuring a time from when the second perforation is detected until a next perforation is detected;

calculation means for calculating, based on the time measured by said time measuring means, an estimation time until the second next perforation will be detected; and signal output means for, when no perforation is detected from when said next perforation is detected after an elapse of the calculated time, outputting a film end detection signal.

3. A film end detecting device of a camera, used for a film, in which first and second perforations are regularly formed in correspondence with frames, and the first perforation for one frame is located to be closer to a leading end of the film than the second perforation, comprising:

winding means for winding the film, in which an interval L1 between the first and second perforations corresponding to a given frame is shorter than an interval L2 between the second perforation corresponding to the given frame and the first perforation corresponding to the next frame, and an end detection perforation is formed next to the second perforation corresponding to a last frame at an interval shorter than the interval L2;

detection means for detecting the perforations of the film;

time measuring means for, when the film is wound, detecting a time from when the second perforation is detected until the next perforation is detected; and signal output means for, when the time measured by said time measuring means is shorter than a predetermined reference time, outputting a film end detection signal.

4. A camera which uses a film having perforations for film positioning formed along a longitudinal edge of the film and spaced from each other alternately by a first spacing and a second spacing which is shorter than the first spacing, the perforations being positioned such that each photographing frame of the film is assigned a first perforation on its left side and a second perforation, spaced from said first perforation by said first spacing, on its right side, comprising:

film feeding means for feeding the film in one direction;

detection means for detecting the first and second perforations;

timer means for measuring a predetermined time, the measurement of the predetermined time being started in response to detection by said detection means of one of the second perforations after commencement of film feeding by said film feeding means; and signal output means for outputting a stop signal for stopping the film feeding when a next first perforation, spaced from said one of the second perforations by the second spacing, is detected by said detection means during said measurement of the predetermined time, and for outputting a film end detection signal when the next first perforation is not detected during said measurement of the predetermined time.

5. A camera which uses a film having perforations for film positioning formed along a longitudinal edge of the film and spaced from each other alternately by a first spacing and a second spacing which is shorter than the first spacing, the perforations being positioned such that each photographing frame of the film is assigned a first perforation on its left side and a second perforation, spaced from said first perforation by said first spacing, on its right side, comprising:

film feeding means for feeding the film in one direction;

detection means for detecting the first and second perforations;

timer means, which starts a measurement of time synchronized with commencement of film feeding, for measuring a time from the commencement of the film feeding by said film feeding means until said detection means detects one of the second perforations;

calculation means for calculating, based on the time measured by said timer means, a time from when said detection means detects said one of the second perforations until said detection means detects a next first perforation, spaced from said one of the second perforations by said second spacing; and signal output means for outputting a stop signal for stopping the film feeding when said detection means detects said next first perforation during said time calculated by said calculation means from when said one of the second perforations is detected, and for outputting a film end detection signal when said next first perforation is not detected during said time calculated by said calculation means from when said one of the second perforations is detected.

6. A camera which uses a film in a film cartridge and having perforations for film positioning formed along a longitudinal edge of the film and spaced from each other alternately by a first spacing and a second spacing which is shorter than the first spacing, the perforations being positioned such that each photographing frame of the film is assigned a first perforation on its left side and a second perforation, spaced from said first perforation by said first spacing, on its right side, comprising:

film feeding means to wind a film by one frame upon completion of a photographing operation of each frame;

recording means for recording information for a photographed frame in a recording region of the film upon the winding of the frames first determination means for determining whether the photographed frame is a last frame;

second determination means for determining whether the film has been wound by at least an amount capable of recording information for the last frame after the completion of the photographing operation of the last frame; and control means, responsive to outputs of said first and second determination means, for controlling said film feeding means to stop the film winding before the film is entirely drawn out from the film cartridge.

7. A camera which uses a film having perforations for film positioning formed along a longitudinal edge of the film and spaced from each other alternately by a first spacing and a second spacing which is shorter than the first spacing, the perforations being positioned such that each photographing frame of the film is assigned a first perforation on its left side and a second perforation, spaced from said first perforation by said first spacing, on its right side, comprising:

film feeding means for feeding the film in one direction;

detection means for detecting the first and second perforations;

timer means for measuring a predetermined time, the measurement of the predetermined time being started in response to detection by said detection means of one of the second perforations after commencement of film feeding by said film feeding means;

signal output means for outputting a stop signal for stopping the film feeding when a next first perforation, spaced from said one of the second perforations by the second spacing, is detected by said detection means during said measurement of the predetermined time, and for outputting a film end detection signal when the next first perforation is not detected during said measurement of the predetermined time; and recording means for recording information for a photographed frame in a recording region of the film upon the winding operation of the frame.

8. A method of information recording for a camera which uses a film in a film cartridge and having perforations for film positioning formed along a longitudinal edge of the film and spaced from each other alternately by a first spacing and a second spacing which is shorter than the first spacing, the perforations being positioned such that each photographing frame of the film is assigned a first perforation on its left side and a second perforation, spaced from said first perforation by said first spacing, on its right side, comprising the steps of:

winding a film by one frame upon completion of a photographing operation of each frames;

recording information for a photographed frame in a recording region of the film upon the winding operation of the frames;

determining whether the photographed frame is a last frame;

determining whether the film has been wound by at least an amount capable of recording information for the last frame after the completion of the photographing operation of the last frame; and controlling the film winding, responsive to results of the aforesaid determining steps, to stop the film winding before the film is entirely drawn out from the film cartridge.

9. A method for controlling film feeding in a camera which uses a film having perforations for film positioning formed along a longitudinal edge of the film and spaced from each other alternately by a first spacing and a second spacing which is shorter than the first spacing, the perforations being positioned such that each photographing frame of the film is assigned a first perforation on its left side and a second perforation, spaced from said first perforation by said first spacing, on its right side, comprising the steps of:

feeding the film in one direction;

detecting the first and second perforations;

measuring a predetermined time, the measurement of the predetermined time being started in response to detection in the aforesaid detecting step of one of the second perforations after commencement of film feeding; and outputting a stop signal for stopping the film feeding when a next first perforation, spaced from said one of the second perforations by the second spacing, is detected during said measuring of the predetermined time, and outputting a film end detection signal when the next first perforation is not detected during said measurement of the predetermined time.

10. A method for controlling film feeding in a camera which uses a film having perforations for film positioning formed along a longitudinal edge of the film and spaced from each other alternately by a first spacing and a second spacing which is shorter than the first spacing, the perforations being positioned such that each photographing frame of the film is assigned a first perforation on its left side and a second perforation, spaced from said first perforation by said first spacing, on its right side, comprising the steps of:

feeding the film in one direction;

detecting the first and second perforations;

measuring a time from the commencement of the film feeding until one of the second perforations is detected;

calculating, based on the measured time, a time from when said one of the second perforations is detected until a next first perforation, spaced from said one of the second perforations by said second spacing, will be detected; and outputting a stop signal for stopping the film feeding when said next first perforation is detected during said time calculated in the calculating step from when said one of the second perforations is detected, and outputting a film end detection signal when said next first perforation is not detected during said time calculated in the calculating step from when said one of the second perforations is detected.

11. A method for detecting a film end, which is used for a film having film aligning perforations formed at a predetermined interval in correspondence with frames, comprising:

winding the film, which has an end detection perforation formed at an interval smaller than the predetermined interval on a film end side of the film aligning perforation of a last frame;

measuring, when the film is wound, with the perforations being detected, a time from when a film aligning perforation is detected until the next perforation is detected; and outputting, when the time measured by said time measuring is shorter than a predetermined reference time, a film end detection signal.

12. A method for detecting a film end, used for a film, in which first and second perforations are regularly formed in units of frames, and the first perforation for one frame is located to be closer to a leading end of the film than the second perforation, comprising:

winding the film, in which one end detection perforation is formed next to the second perforation for a last frame;

measuring, when the film is wound with the perforations being detected, a time from when the second perforation is detected until the next perforation is detected;

calculating, based on the time measured by said time measuring means, an estimation time until the second next perforation will be detected; and outputting, when no perforation is detected from when said next perforation is detected after an elapse of the calculated time, a film end detection signal.

13. A method for detecting a film end, used for a film, in which first and second perforations are regularly formed in correspondence with frames, and the first perforation for one frame is located to be closer to a leading end of the film than the second perforation, comprising:

winding the film, in which an interval L1 between the first and second perforations corresponding to a given frame is shorter than an interval L2 between the second perforation corresponding to the given frame and the first perforation corresponding to the next frame, and an end detection perforation is formed next to the second perforation corresponding to a last frame at an interval shorter than the interval L2;

measuring, when the film is wound with the perforations being detected, a time from when the second perforation is detected until the next perforation is detected; and outputting, when the time measured by said time measuring means is shorter than a predetermined reference time, a film end detection signal.

14. A film end detecting device, which is used for a film having film aligning perforations formed at a predetermined interval in correspondence with frames, comprising:

a winding device to wind the film, which has an end detection perforation formed at an interval smaller than the predetermined interval on a film end side of the film aligning perforation of a last frame;

a detector to detect the perforations of the film;

a timer electrically connected to said winding device, to measure, when the film is wound, a time from when a given film aligning perforation is detected unit the next perforation is detected; and a signal output electrically connected to said timer, to output, when the time measured by said timer is shorter than a predetermined reference time, a film end detection signal.

15. A film end detecting device, used for a film, in which first and second perforations are regularly formed in units of frames, and the first perforation for one frame is located to be closer to a leading end of the film than the second perforation, comprising:

a winding device to wind the film, in which one end detection perforation is formed next to the second perforation for a last frame;

a detector to detect the perforations of the film;

a timer electrically connected to said winding device, to measure, when the film is wound, a time from when the second perforation is detected until a next perforation is detected;

a calculator electrically connected to said timer, to calculate, based on the time measured by said timer, an estimation time until the second next perforation will be detected; and a signal output device electrically connected to said timer and said calculator, to output, when no perforation is detected from when said next perforation is detected after an elapse of the calculated time, a film end detection signal.

16. A film end detecting device, used for a film, in which first and second perforations are regularly formed in correspondence with frames, and the first perforation for one frame is located to be closer to a leading end of the film than the second perforation, comprising:

a winding device to wind the film, in which an interval L1 between the first and second perforations corresponding to a given frame is shorter than an interval L2 between the second perforation corresponding to the given frame and the first perforation corresponding to the next frame, and an end detection perforation is formed next to the second perforation corresponding to a last frame at an interval shorter than the interval L2;

a detector to detect the perforations of the film;

a timer electrically connected to said winding device, to detect, when the film is wound, a time from when the second perforation is detected until the next perforation is detected; and a signal output device electrically connected to said timer, to output, when the time measured by said timer is shorter than a predetermined reference time, a film end detection signal.

17. A film end detection device which is used for a film having perforations for film positioning formed along a longitudinal edge of the film and spaced from each other alternately by a first spacing and a second spacing which is shorter than the first spacing, the perforations being positioned such that each frame of the film is assigned a first perforation on its left side and a second perforation, spaced from said first perforation by said first spacing, on its right side, comprising:

a film feeding a device to feed the film in one direction;

a detector to detect the first and second perforations;

a timer electrically connected to said film feeding device and said detector, to measure a predetermined time, the measurement of the predetermined time being started in response to detection by said detector of one of the second perforations after commencement of film feeding by said film feeding device; and a signal output device electrically connected to said timer, to output a stop signal for stopping the film feeding when a next first perforation, spaced from said one of the second perforations by the second spacing, is detected by said detector during said measurement of the predetermined time, and to output a film end detection signal when the next first perforation is not detected during said measurement of the predetermined time.

18. A film end detection device, which is used for a film having perforations for film positioning formed along a longitudinal edge of the film and spaced from each other alternately by a first spacing and a second spacing which is shorter than the first spacing, the perforations being positioned such that each frame of the film is assigned a first perforation on its left side and a second perforation, spaced from said first perforation by said first spacing, on its right side, comprising:

a film feeding device to feed the film in one direction;

a detector to detect the first and second perforations;

a timer electrically connected to said film feeding device and said detector, to start a measurement of time synchronized with commencement of film feeding, and to measure a time from the commencement of the film feeding by said film feeding device until said detector detects a next first perforation, spaced from said one of the second perforations by said second spacing; and a calculator electrically connected to said timer, to calculate, based on the time measured by said timer, a time from when said detector detects said one of the second perforations until said detector detects a next first perforation, spaced from said one of the second perforations by said second spacing; and a signal output device electrically connected to said detector, said timer and said calculator, to output a stop signal for stopping the film feeding when said detector detects said next first perforation during said time calculated by said calculator from when said one of the second perforations is detected, and to output a film end detection signal when said next first perforation is not detected during said time calculated by said calculator from when said one of the second perforations is detected.

19. A film feeding control device which is used for a film in a film cartridge and having perforations for film positioning formed along a longitudinal edge of the film and spaced from each other alternately by a first spacing and a second spacing which is shorter than the first spacing, the perforations being positioned such that each frame of the film is assigned a first perforation on its left side and a second perforation, spaced from said first perforation by said first spacing, on its right side, comprising:

a film feeding device to wind a film by one frame;

a recorder electrically connected to said film feeding device, which records information for a frame in a recording region of the film upon the winding of the frame;

a first determination device to determine whether the frame is a last frame;

a second determination device to determine whether the film has been wound by at least an amount capable of recording information for the last frame; and a controller electrically connected to said first and second determination devices and said film feeding device, responsive to outputs of said first and second determination devices, to control said film feeding device to stop the film winding before the film is entirely drawn out from the film cartridge.

20. A film feeding control device which is used for a film having perforations for film positioning formed along a longitudinal edge of the film and spaced from each other alternately by a first spacing and a second spacing which is shorter than the first spacing, the perforations being positioned such that each frame of the film is assigned a first perforation on its left side and a second perforation, spaced from said first perforation by said first spacing, on its right side, comprising:

a film feeding device to feed the film in one direction;

a detector to detect the first and second perforations;

a timer electrically connected to said film feeding device and said detector, to measure a predetermined time, the measurement of the predetermined time being started in response to detection by said detector of one of the second perforations after commencement of film feeding by said film feeding device;

a signal output device electrically connected to said detector and said timer, to output a stop signal for stopping the film feeding when a next first perforation, spaced from said one of the second perforations by the second spacing, is detected by said detector during said measurement of the predetermined time, and to output a film end detection signal when the next first perforation is not detected during said measurement of the predetermined time; and a recorder electrically connected to said film feeding device, to record information for a frame in a recording region of the film upon the winding operation of the frame.

21. A method of information recording which is used for a film in a film cartridge and having perforations for film positioning formed along a longitudinal edge of the film and spaced from each other alternately by a first spacing and a second spacing which is shorter than the first spacing, the perforations being positioned such that each frame of the film is assigned a first perforation on its left side and a second perforation, spaced from said first perforation by said first spacing, on its right side, comprising:

winding a film by one frame;

recording information for a frame in a recording region of the film upon the winding operation of the frame;

determining whether the frame is a last frame;

determining whether the film has been wound by at least an amount capable of recording information for the last frame; and controlling the film winding, responsive to results of the determining steps, to stop the film winding before the film is entirely drawn out from the film cartridge.

22. A method for controlling film feeding which is used for a film having perforations for film positioning formed along a longitudinal edge of the film and spaced from each other alternately by a first spacing and a second spacing which is shorter than the first spacing, the perforations being positioned such that each frame of the film is assigned a first perforation its left side and a second perforation, spaced from said first perforation by said first spacing, on its right side, comprising:

feeding the film in one direction;

detecting the first and second perforations;

measuring a predetermined time, the measurement of the predetermined time being started in response to detection in the detecting step of one of the second perforations after commencement of film feeding; and outputting a stop signal for stopping the film feeding when a next first perforation, spaced from said one of the second perforations by the second spacing, is detected during said measuring of the predetermined time, and outputting a film end detection signal when the next first perforation is not detected during said measurement of the predetermined time.

23. A method for controlling film feeding, which is used for a film having perforations for film positioning formed along a longitudinal edge of the film and spaced from each other alternately by a first spacing and a second spacing which is shorter than the first spacing, the perforations being positioned such that each frame of the film is assigned a first perforation on its left side, and a second perforation, spaced from said first perforation by said first spacing, on its right side, comprising:

feeding the film in one direction;

detecting the first and second perforations;

measuring a time from the commencement of the film feeding until one of the second perforations is detected;

calculating, based on the measured time, a time from when said one of the second perforations is detected until a next first perforation, spaced from said one of the second perforations by said second spacing, will be detected; and outputting a stop signal for stopping the film feeding when said next first perforations detected during said time calculated in the calculating step from when said one of the second perforations is detected, and outputting a film end detection signal when said next first perforation is not detected during said time calculated in the calculating step from when said one of the second perforations is detected.

* * * * *

UNITED STATES PATENT AND TRADEMARK OFFICE
CERTIFICATE OF CORRECTION

PATENT NO. : 5,506,648
DATED : April 9, 1996
INVENTOR(S) : KAZAMI et al.

It is certified that error appears in the above-indentified patent and that said Letters Patent is hereby corrected as shown below:

Column 14, line 53, "frames" should be --frame;--.

Column 15, line 38, "frames;" should be --frame;--;

line 41, "frames;" should be --frame;--.

Signed and Sealed this

Twenty-fifth Day of June, 1996

Attest:

BRUCE LEHMAN

Attesting Officer

Commissioner of Patents and Trademarks